United States Patent [19]
Iwaki

[11] Patent Number: 5,969,917
[45] Date of Patent: Oct. 19, 1999

[54] DISC CARTRIDGE WITH LINERS UPLIFTED BY LIFTER UNITS HAVING COMB SHAPED RIB-LIKE PROTRUSIONS

[75] Inventor: Yuji Iwaki, Miyagi, Japan

[73] Assignee: Sony Corporation, Tokyo, Japan

[21] Appl. No.: 09/076,424

[22] Filed: May 12, 1998

[30] Foreign Application Priority Data

May 20, 1997 [JP] Japan .................................... 9-129965

[51] Int. Cl.⁶ ................................................ G11B 23/03
[52] U.S. Cl. ......................................................... 360/133
[58] Field of Search ............................ 360/133; 369/291

[56] References Cited

U.S. PATENT DOCUMENTS

| | | | |
|---|---|---|---|
| 5,587,860 | 12/1996 | Umebayashi et al. | 360/133 |
| 5,619,391 | 4/1997 | Getzoyan et al. | 360/133 |
| 5,631,791 | 5/1997 | Osaki et al. | 360/133 |
| 5,633,772 | 5/1997 | Ikeda et al. | 360/133 |
| 5,687,048 | 11/1997 | Mizuta | 360/133 |
| 5,812,351 | 9/1998 | Wulfing et al. | 360/133 |
| 5,831,968 | 11/1998 | Tanaka | 369/291 |

Primary Examiner—Jefferson Evans
Attorney, Agent, or Firm—Limbach & Limbach L.L.P.

[57] ABSTRACT

A disc cartridge in which disc cleaning can be made reliably despite prolonged use. The disc cartridge includes a disc-shaped recording medium 1, a main cartridge body unit 11 combined from a pair of cartridge halves 12, 13, a pair of liners 27, 28 for wiping off dust and dirt affixed to the disc-shaped recording medium 1, and plural sets of lifter units 15, 16, 17 comprised of paired rib-like protrusions 18, 21; 19, 22; 20, 23, formed as-one with the inner surfaces of the cartridge halves 12, 13 for uplifting the liners 27, 28 into pressure contact with the front and back sides of the disc-shaped recording medium 1. The plural sets of the lifter units are provided for extending along the direction of rotation of the disc-shaped recording medium. At least one of the rib-like protrusion 18, 20, 22 of the lifter units are designed as substantially comb-shaped rib-like protrusions combined from radial ribs 29, 31, 33 and circumferential ribs 30, 32, 34.

4 Claims, 8 Drawing Sheets

DISC CARTRIDGE WITH LINERS UPLIFTED BY LIFTER UNITS HAVING COMB SHAPED RIB-LIKE PROTRUSIONS

A disc cartridge 100 is made up of an upper cartridge half 102 and a lower cartridge half 103 abutted and coupled to each other to form a main cartridge body unit 101 in the form of a box of a thin thickness, as shown in FIG. 1. The upper cartridge half 102 and the lower cartridge half 103 are each molded of a synthetic resin in substantially the shape of a shallow saucer. The upper cartridge half 102 and the lower cartridge half 103 are formed with recording/reproducing apertures 102a, 103a into which is intruded a magnetic head unit of the recording/reproducing apparatus. Centrally of the lower cartridge half 103 is formed a disc table entrance aperture 103b via which the clamp plate 4 of the disc 1 is exposed to the outside and via which is intruded the disc table of the recording/reproducing apparatus.

On the disc cartridge 100 is mounted a shutter member 105 configured for protecting the disc 1 rotatably accommodated in a disc housing section 104 arranged within the main cartridge body unit 101 and for preventing dust and dirt from entering its inside. The shutter member 105 is usually biased by a shutter spring 106 in a direction of closing the recording/reproducing apertures 102, 103. When the disc cartridge 100 is loaded on the recording/reproducing apparatus, the shutter member 105 is slid against the force of the shutter spring 106 to open the recording/reproducing apertures 102a, 103a.

On the disc cartridge 100 is assembled a mistaken recording inhibiting member 107 for preventing inadvertent erasure of information signals recorded on the disc 1. The mistaken recording inhibiting member 107 is switched between a first position of opening the mistaken recording detection holes 102c, 103c formed in the upper and lower halves 102, 103 and a second position of closing the mistaken recording detection holes 102c, 103c. When the mistaken recording inhibiting member 107 is set to the first position of closing mistaken recording detection holes 102c, 103c, the disc cartridge 100 disables detection of the mistaken recording detection holes 102c, 103c by the mistaken recording inhibiting mechanism of the recording/reproducing apparatus. The disc cartridge thus disables the recording operation of information signals on the disc 1.

In the disc cartridge 100, if dust and dirt intruded via the recording/reproducing apertures 102a, 103a become affixed to the disc 1, the recorded information signals become unable to be reproduced, or information signals cannot be recorded correctly. On the other hand, the dust and dirt affixed to the disc 1 tend to cause fatal problems such as destruction of the disc 1 or the magnetic head. Thus, the disc cartridge 100 is provided with a cleaning mechanism for wiping off the dust and dirt affixed to the disc 1. This cleaning mechanism is made up of upper and lower liners 108, 109 bonded to the inner sides of the disc housing section 104 of the upper and lower cartridge halves 102, 103, a retention rib 110 formed as-one with the inner side of the upper cartridge half 102 and a lifter 111 mounted facing the retention rib 110 on the inner side of the lower cartridge half 103.

These liners 108, 109 are formed by flexible contractible non-woven cloths formed of synthetic fibers, such as polypropylene, polyester, nylon or rayon, spun alone or as mixedly spun articles and thermally fused together or bonded together with a binder, such as a thermoplastic resin or rubber, so as not to cause entanglements. The liners 108, 109 are formed as rings having the diameter approximately equal to the inner diameter of the disc housing section 104 and are cut out in areas that are aligned with the recording/reproducing apertures 102a, 103a.

The retention rib 110 includes a pair of parallel radial ribs 112a, 112b, extending in a direction substantially perpendicular to the direction of rotation of the disc 1, as indicated by arrow in FIG. 2, and a large number of parallel circumferential ribs 113 extending parallel to the direction of rotation. The retention rib 110 in its entirety is comb-shaped and is provided on the inner surface of the upper cartridge half 102. The parallel circumferential ribs 113 are connected as-one to the lateral sides of the ribs 112b so as to lie downstream of the ribs 112b looking in the direction of rotation of the disc 1.

The lifter 111 is formed by punching a stainless steel plate with a thickness of approximately 50 $\mu$m or a synthetic resin sheet with a thickness of 100 to 200 $\mu$m to a desired shape and warping the plate at an appropriate angle. The lifter 111 is secured at its end by welding or by adhesion to the inner surface of the lower cartridge half 3 in a cantilevered fashion so that its free end uplifts the liner 109 towards the disc 1. The lifter 111 is set so that the separation between its free end and the retention rib 110 is slightly smaller than the thickness of the disc 1 and that of the liners 108 or 109. Therefore, the lifter 111 thrusts the liner 109 to the major surface of the disc 1 as the lifter is deformed slightly elastically. Stated differently, the disc 1 is run in rotation with both sides clamped by the liners 108, 109.

When the disc cartridge 100 is loaded on the recording/reproducing apparatus, the disc 1 has its clamp plate 4 magnetically chucked by the disc table intruded via the disc table entrance aperture 103b of the lower cartridge half 103. With the disc cartridge 100, the magnetic head mechanism is intruded into its inside via the recording/reproducing apertures 102a, 103a opened by the shutter member actuated by the shutter opening member. For recording or reproduction, the disc 1 accommodated in the disc cartridge 100 is run in rotation by the spindle shaft of the disc table for recording or reproducing information signals on or from the magnetic recording layer of the disc 1 by the magnetic head unit.

With the disc cartridge 100, the liners 108, 109, uplifted by the lifter 111, are brought into sliding contact with the front and back sides of the rotating disc 1, as shown in FIG. 3, so that the affixed dust and dirt are captured by the fibers and wiped off by way of cleaning. Meanwhile, the liners 108, 109 perform not only the cleaning of the disc 1, but also the torque braking of applying the elastic force of the lifter 111 to cause the stable state rotation of the disc 1.

With the above-described conventional disc cartridge 100, laborious assembling operations are required for mounting the small-sized lifter 111 on the lower cartridge half 103. The lifter 111 is assembled in a slightly elastically deformed state for generating the elastic force of clamping the front and back surfaces of the disc 1 by the liners 108, 109, as described above. Thus, with prolonged use of the disc cartridge 100, the lifter 111 tends to undergo creeping to lead to failure in applying a pre-set operation to the liners 108, 109.

The conventional disc cartridge 100 experiences a problem not only of the mounting angle of the lifter 111 but also a problem of difficulties in management or manufacture due to changes in elasticity ascribable to the temperature or humidity conditions, dimensional stability of the upper and lower cartridge halves 102, 103 or to the thicknesses of the liners 108, 109. The disc cartridge 100 also experiences a problem that, if a pre-set contact pressure is not maintained between the disc 1 and the liners 108, 109 by the elasticity of the lifter 111, no sufficient cleaning operation is not assured, while smooth rotation of the disc 1 is impeded.

Moreover, with the conventional disc cartridge, since the cleaning mechanism is provided in one location, uniform cleaning cannot be applied to the disc 1. In addition, with the disc cartridge 100, the plane of rotation of the disc 1 tends to be unstable to render it difficult to maintain a stable contact state of the magnetic head. Although this problem can be overcome by providing a number of the above-mentioned cleaning units, this increases the number of steps of the laborious lifter mounting operation to raise the cost and complicate the adjustment of the disc cartridge 100.

SUMMARY OF THE INVENTION

It is an object of the present invention to provide a disc cartridge in which the disc cleaning can be effected reliably despite prolonged use and the disc can be rotated in stability to improve the reliability.

The present invention provides a disc cartridge including a disc-shaped recording medium, a main cartridge body unit made up of a pair of cartridge halves abutted and connected to each other for defining therein a disc housing section in which to hold rotatably the disc-shaped recording medium, and a pair of liners arranged in the inside of the disc housing section of the paired cartridge halves. The liners are arranged for having a sliding contact with the upper and lower surfaces of the rotating disc-shaped recording medium for wiping off the affixed dust and dirt. The disc cartridge also includes lifter means comprised of paired rib-like protrusions formed on the inner surfaces of the pair of cartridge halves delimiting the disc housing section in a facing relation to each other. The rib-like protrusions press the liners against the front and back surfaces of the disc-shaped recording medium. Plural sets of the lifter means are provided in the disc housing section of the cartridge halves along the direction of rotation of the disc-shaped recording medium. At least one rib-like protrusions of the paired rib-like protrusions are substantially comb-shaped and are made up of radial ribs extending at right angles to the direction of rotation of the disc-shaped recording medium and a number of parallel circumferential ribs connected as-one to the radial ribs on the downstream side thereof in the direction of rotation of the disc-shaped recording medium so that the parallel circumferential ribs run at right angles to the radial ribs.

With the disc cartridge according to the present invention, in which the plural sets of lifter units comprised of rib-like protrusions for uplifting the liners are formed as-one with the cartridge halves, the uplifting operation of the lifter units is not changed despite prolonged use, thus reliably achieving the cleaning an torque braking action for the disc-shaped recording medium to permit the disc-shaped recording medium to be rotated in a more stable attitude. Therefore, the disc cartridge is maintained in a high reliability state even after prolonged use.

The substantially comb-shaped lifter units tend to uplift the liners in the direction of disc rotation and in the direction perpendicular thereto in stable state by the radial ribs provided in a direction perpendicular to the rotating direction and by a large number of the circumferential ribs mounted downstream of the radial ribs. Therefore, the dust and dirt affixed to the front and back sides of the disc-shaped recording medium of the disc cartridge can be reliably wiped off to assure recording/reproduction of information signals to prevent destruction of the disc-shaped recording medium or the magnetic head.

DESCRIPTION OF PREFERRED EMBODIMENTS

Figure 1:
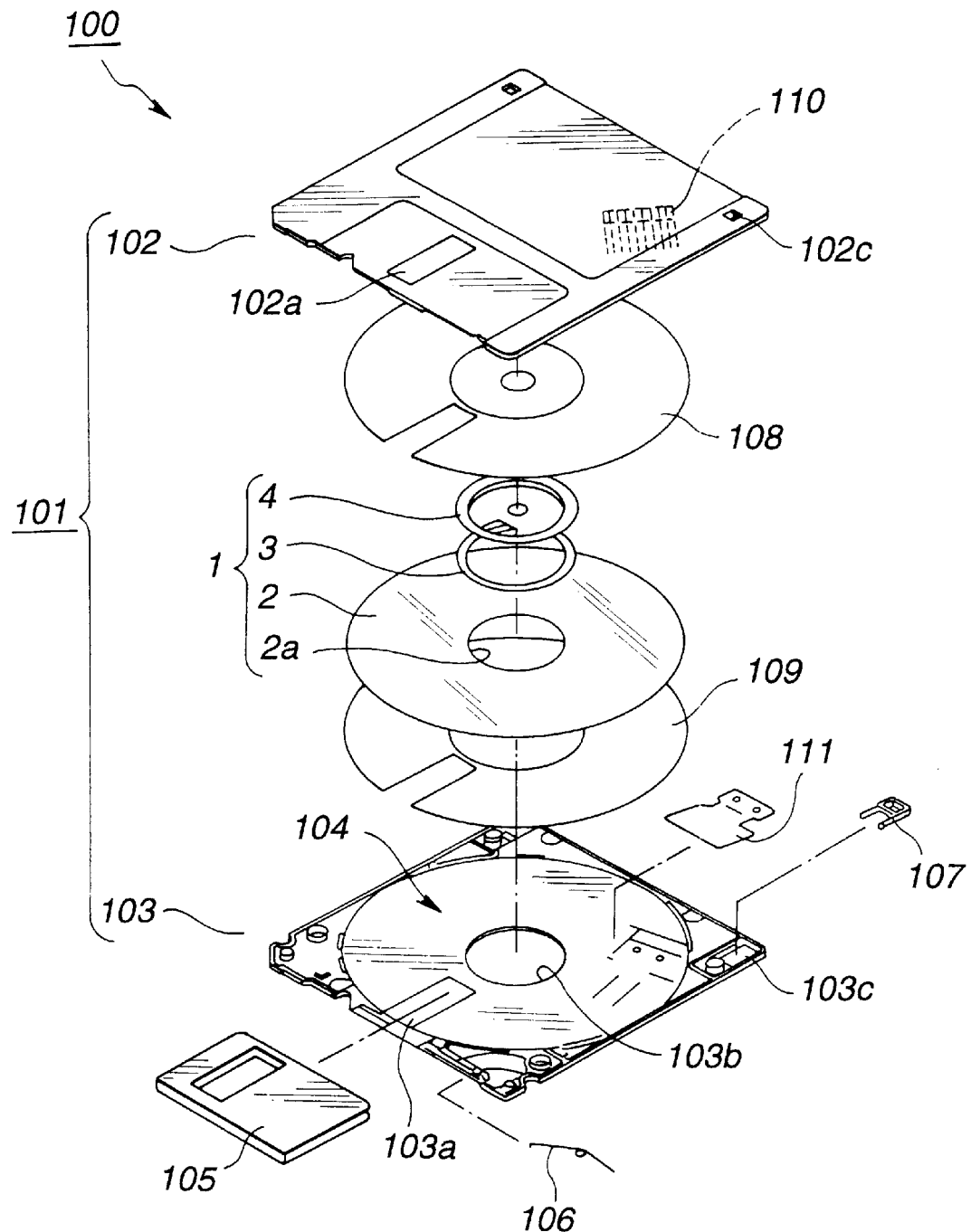
FIG. 1 is an exploded perspective view of a conventional disc cartridge.
Figure 2:
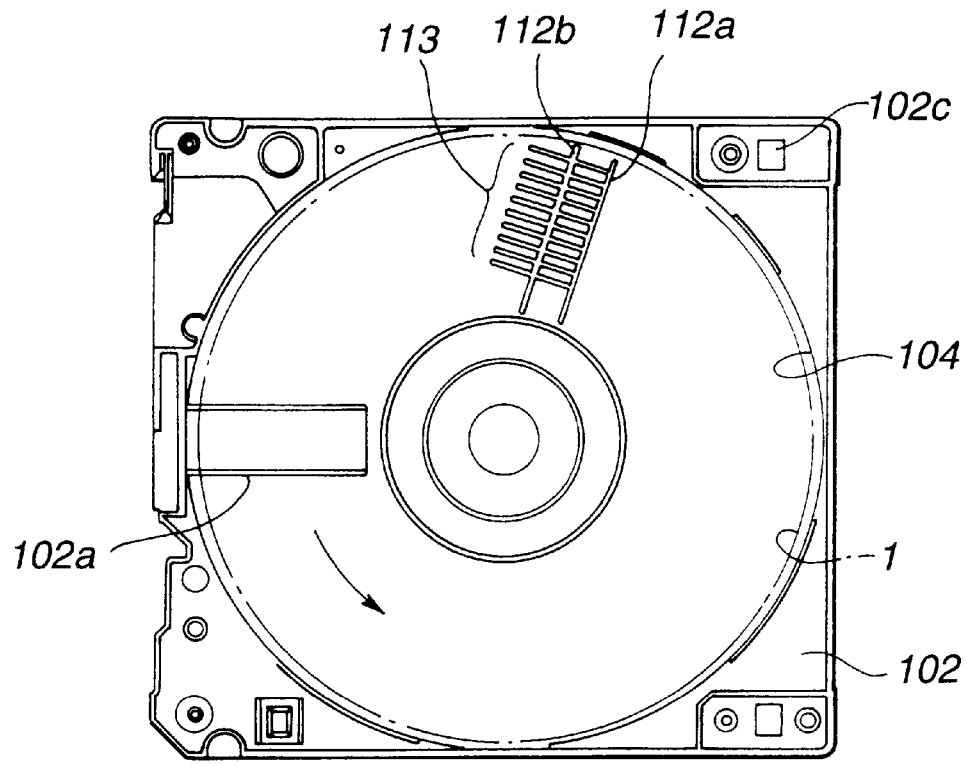
FIG. 2 is a bottom view of an upper cartridge half constituting a main cartridge body unit of the conventional disc cartridge.
Figure 3:
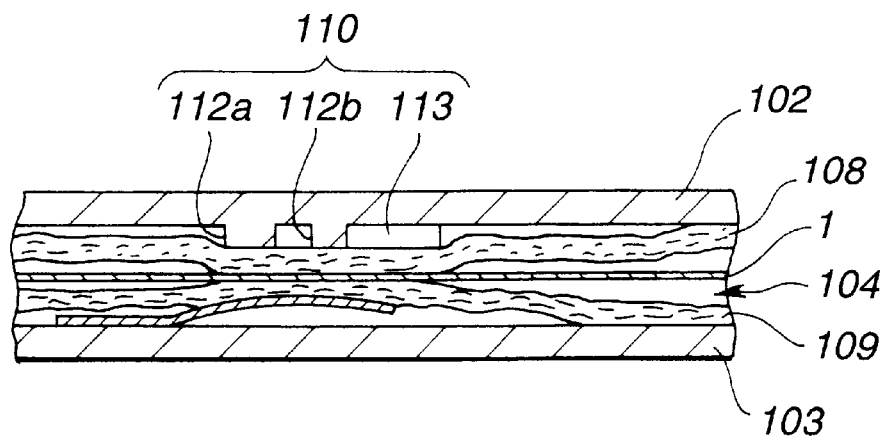
FIG. 3 is a longitudinal cross-sectional view showing essential parts of the conventional disc cartridge.
Figure 4:
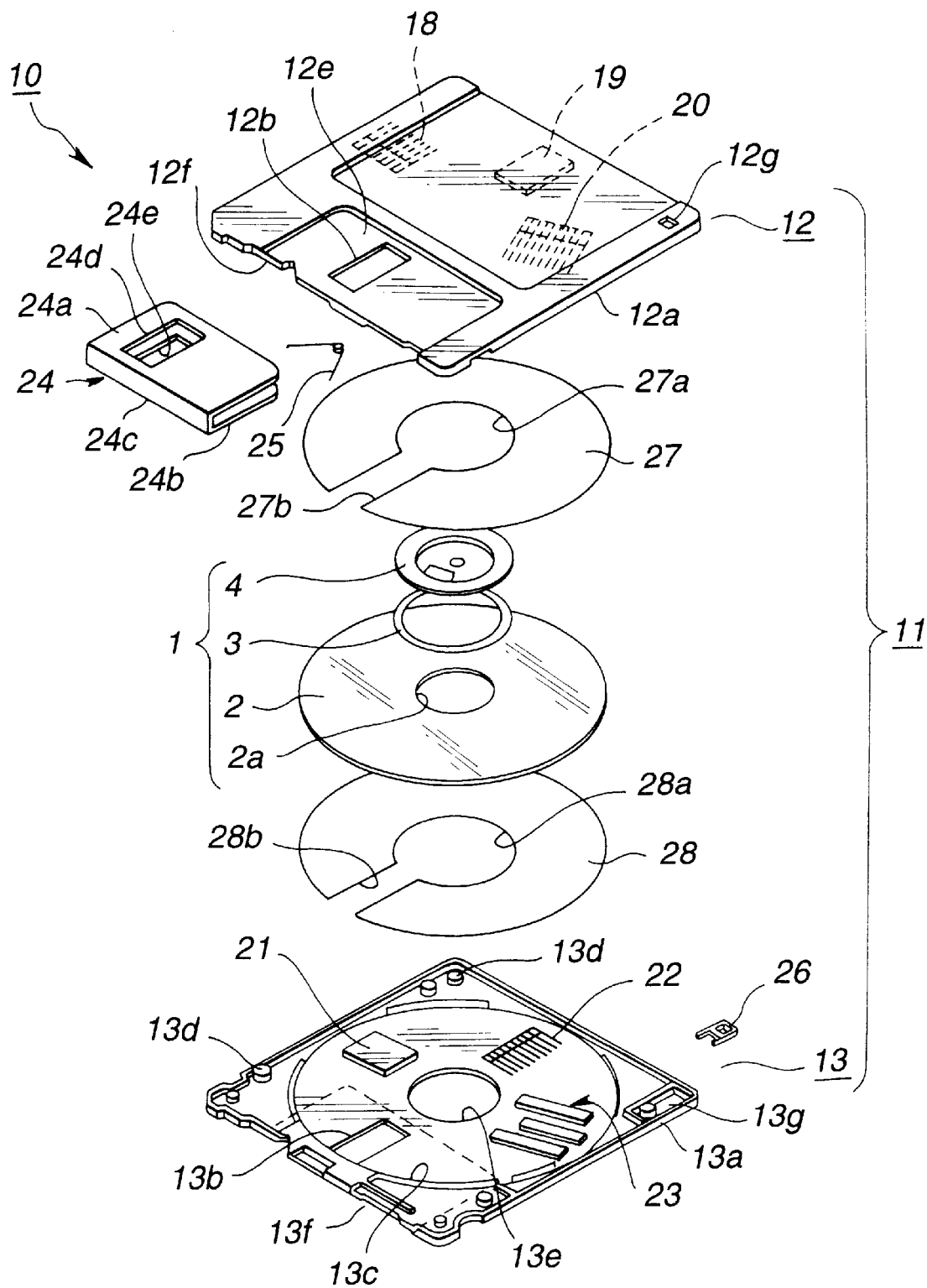
FIG. 4 is an exploded perspective view of a disc cartridge according to the present invention in which a floppy disc is rotatably accommodated in the inside of a main cartridge body unit.

Referring to the drawings, preferred embodiments of the present invention will be explained in detail. FIGS. 4 to 11 show a disc cartridge 10 similar in structure to a floppy disc cartridge rotatably holding a 3.5 inch floppy disc (disc) 1. The disc 1 is similar to the disc 1 provided in the above-mentioned conventional disc cartridge 100 and hence is not explained specifically. The disc cartridge 10 is comprised of an upper cartridge half 12 and a lower cartridge half 13 abutted and connected to each other to constitute a main cartridge body unit 11 of a box-like structure of a thin thickness defining a disc housing section 14 for rotatably housing the disc 1 therein, as shown in FIG. 4. The upper and lower cartridge halves 12, 13 are each molded from synthetic resin in the form of a shallow saucer.

Figure 5:
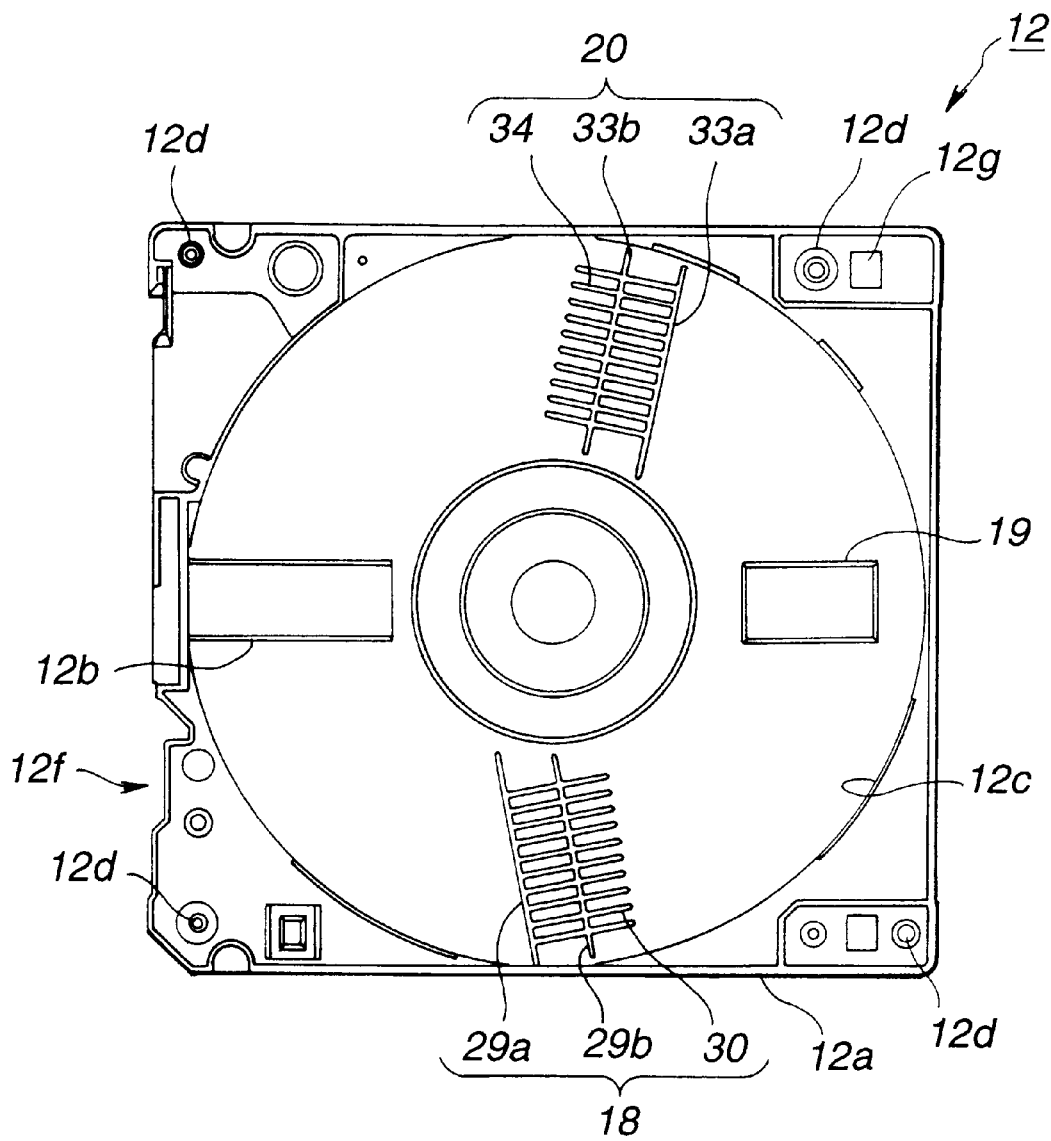
FIG. 5 is a bottom view of an upper cartridge half constituting the main cartridge body unit of the disc cartridge shown in FIG. 4.

The upper cartridge half 12 has its outer rim formed as-one with an upstanding peripheral wall section 12a and is formed with a recording/reproducing aperture 12b, as shown in FIG. 5. The recording/reproducing aperture 12b serves for exposing a portion of the major surface of the disc 1 to outside across the inner and outer rims of the disc 1 and for allowing for intrusion of a magnetic head unit of the recording/reproducing apparatus. The inner surface of the upper cartridge half 12 is formed as-one with a disc housing section defining wall section 12c constituted by plural arcuate upstanding wall sections inscribing the upstanding peripheral wall section 12a. The recording/reproducing aperture 12b is located within the upstanding peripheral wall section 12a. The upper cartridge half 12 has its for corners and other optional points on its inner surface formed with fitting portions 12d for unifying the upper cartridge half 12 with the lower cartridge half 13.

The upper cartridge half 12 has its major surface formed with a shutter slide guide recess 12e in which is disposed the recording/reproducing aperture 12b. The upstanding peripheral wall section 12a on the front side of the upper cartridge half 12 associated with the recording/reproducing aperture 12b is formed with a shutter opening guide groove 12f into which is introduced a shutter driving member of the recording/reproducing apparatus. Within the area of the disc housing section 14 on the inner surface of the upper cartridge half 12 are formed first rib-like protrusions 18, second rib-like protrusions 19 and third rib-like protrusions 20 making up first third lifter units 15 to 17, respectively, as will be explained in detail subsequently.

Figure 6:
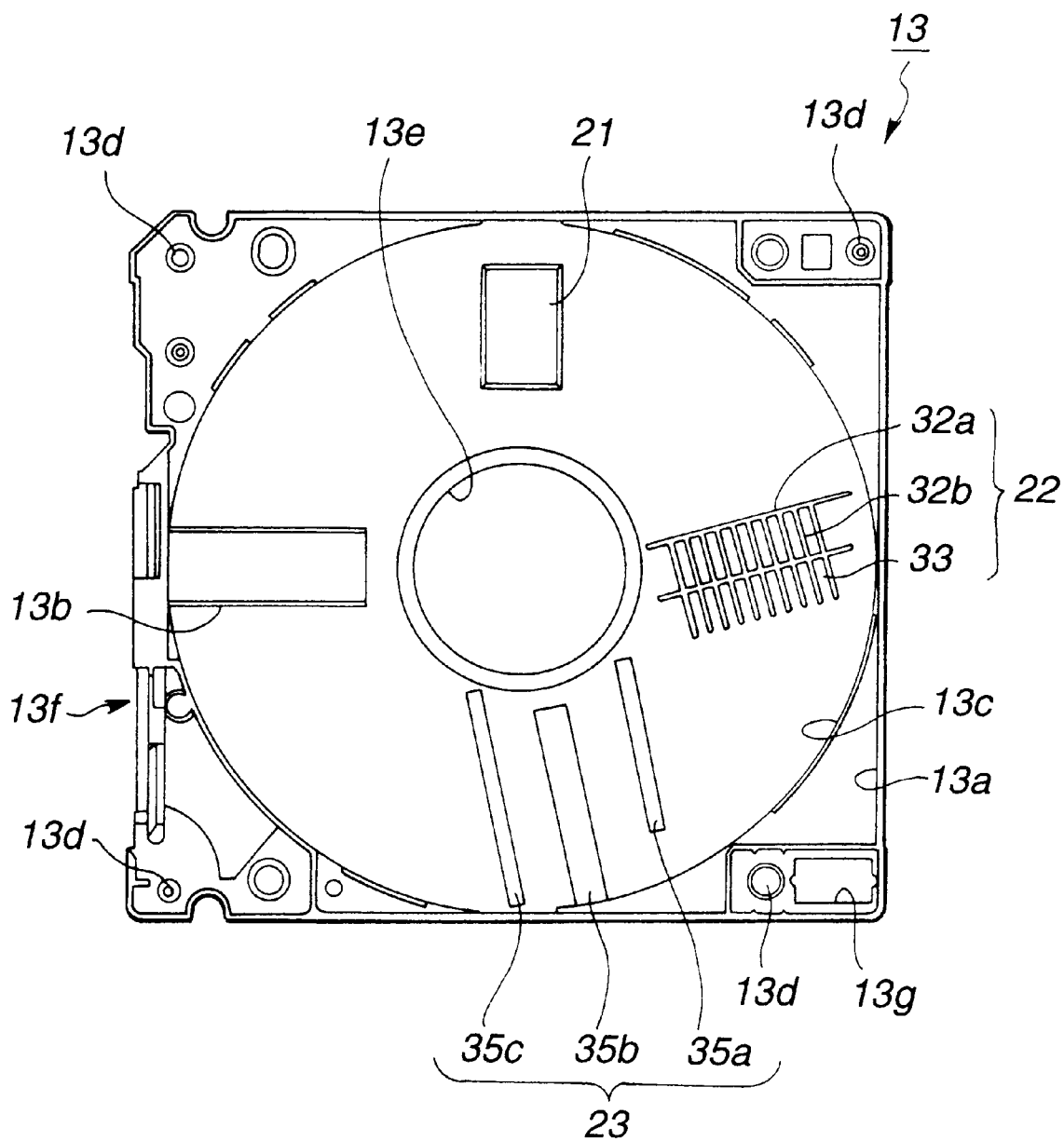
FIG. 6 is a plan view of the lower cartridge half constituting the main cartridge body unit of the disc cartridge shown in FIG. 4.

The lower cartridge half 13 has its outer rim formed as-one with an upstanding peripheral wall section 13a, and includes a recording/reproducing aperture 13b, as shown in FIG. 6. The recording/reproducing aperture 13b serves for exposing part of the major surface of the disc 1 to outside across the inner and outer rims of the disc and for allowing for intrusion of a magnetic head unit of the recording/reproducing unit. The inner surface of the lower cartridge half 13 is formed with a disc housing section defining wall section 13c made up of plural arcuate upstanding wall sections constituting the disc housing section 14 in cooperation with the disc housing section defining wall section 12c of the upper cartridge half 12. The disc housing section defining wall section 13c, within which is disposed the recording/reproducing aperture 12b, inscribes the upstanding peripheral wall section 12a. The lower cartridge half 13 is formed as-one with fitting portions 13d in meeting with the fitting portions 12d of the upper cartridge half 12 at the four corners thereof and at other optional portions.

The lower cartridge half 13 is formed with a shutter slide guide recess on its major surface so that the recording/reproducing aperture 13b is disposed within the slide guide recess. Centrally of the lower cartridge half 13 is formed a disc table entrance aperture 13e which allows for intrusion of the disc table of the recording/reproducing apparatus. The upstanding peripheral wall section 13a on the front side of the lower cartridge half 13 associated with the recording/reproducing aperture 13b is formed with a shutter opening guide groove 13f which allows fro intrusion of the shutter driving member of the recording/reproducing apparatus in cooperation with the shutter guide groove 12f of the upper cartridge half 12. Within the area of the disc housing section 14 on the inner surface of the lower cartridge half 13 are formed first rib-like protrusions 21, second rib-like protrusions 22 and third rib-like protrusions 23 making up the first to third lifter units 15 to 17, respectively, in cooperation with the first to third rib-like protrusions 18 to 20 of the upper cartridge half 12, as will be explained in detail subsequently.

The upper cartridge half 12 and the lower cartridge half 13, configured as described above, are unified together to constitute a main cartridge body unit 11, by abutting and assembling the opposing upstanding peripheral wall section 12a, 13a and the fitting portions 12d, 13d together and by applying ultrasonic welding to the fitting portions 12d, 13d. Within the disc housing section 14 of the main cartridge body unit 11 is rotatably mounted the disc 1 so that its clamp plate 4 is intruded in the disc table entrance aperture 13e. Also, the disc 1 has part of the upper and lower sides thereof exposed to outside via the recording/reproducing apertures 12b, 13b across the inner and outer rims of the disc, as explained previously.

When the disc cartridge 1 is loaded on the recording/reproducing apparatus, the disc table constituting the disc rotating/driving unit is intruded via the disc table entrance aperture 13e into the inside of the main cartridge body unit 11 to chuck magnetically the clamp plate 4 of the disc 1. For recording/reproduction, the disc 1 in the disc cartridge is run in rotation by the spindle shaft within the disc housing section 14. This operation is similar to that of the conventional disc cartridge 100.

On the main cartridge body unit 11 of the disc cartridge 10 is slidably mounted a shutter member 24 serving for closing the recording/reproducing apertures 12b, 13b for protecting the disc 1 rotatably housed in the disc housing section 14 and for preventing intrusion of dust and dirt. The shutter member 24 is similar in structure to that of the conventional disc cartridge 100.

Specifically, the shutter member 24 is U-shaped in cross-section in its entirety, and is made up of a pair of shutter plates 24a, 24b and a connecting portion 24c interconnecting the proximal ends of the shutter plates 24a, 24b. The shutter plates 24a, 24b are sized sufficiently to close the recording/reproducing apertures 12b, 13b and are adapted for sliding within the slide guide recess 12e. The connecting portion 24c is slid along a lateral side of the main cartridge body unit 11. The shutter plates 24a, 24b are formed with apertures 24d, 24e substantially coextensive as the recording/reproducing apertures 12b, 13b respectively.

The shutter member 24 is biased by the force of a shutter spring 25 mounted at a corner of the lower cartridge half 13 towards one side of the main cartridge body unit 11 so that the apertures 24d, 24e are not in register with the recording/reproducing apertures 12b, 13b, respectively. This prevents dust and dirt from intruding into the inside of the main cartridge body unit 11 of the disc cartridge 10 to prevent damage to the disc 1. When the disc cartridge 10 is loaded on the recording/reproducing apparatus, the shutter member 24 is slid against the bias of the shutter spring 25 by the shutter opening member intruded from the shutter opening guide grooves 12f, 13f of the main cartridge body unit 11.

This locates the apertures 24d, 24e in register with the recording/reproducing apertures 12b, 13b of the disc cartridge 10 to re-open these recording/reproducing apertures 12b, 13b. The magnetic head unit is intruded via the opened recording/reproducing apertures 12b, 13b of the disc cartridge 10 so that the magnetic heads are contacted with the upper and lower sides of the disc 1. The recording/reproducing operation is then carried out for recording/reproducing information signals on or from the magnetic recording layer of the disc 1 of the disc cartridge 10.

The disc cartridge 10 has a mistaken recording inhibiting mechanism for preventing inadvertent erasure of information signals recorded on the disc 1. This mistaken recording inhibiting mechanism is similar to that of the conventional disc cartridge 100. That is, the mistaken recording inhibiting mechanism is constituted by mistaken recording detection holes 12g, 13g provided in facing corners of the upper and lower halves 12, 13 and a mistaken recording inhibiting member 26 assembled on the lower cartridge half 26.

The disc cartridge 10 disables the recording operation of information signals on the disc 1 by the mistaken recording inhibiting member 26 being set in the first position opening the mistaken recording detection holes 12g, 13g. Conversely, the disc cartridge 10 enables the recording operation of information signals on the disc 1 by the mistaken recording inhibiting member 26 being set in the second position closing the mistaken recording detection holes 12g, 13g.

The disc cartridge 10 has a cleaning mechanism for wiping off dust and dirt affixed to the disc 1. The cleaning mechanism is made up of upper and lower liners 27, 28, bonded respectively to the inner sides of the upper and lower halves 12, 13 defining the disc housing section 14, and first to third lifter units 15 to 17 formed as-one with the inner sides of the upper and lower halves 12, 13 defining the disc housing section 14.

The upper and lower liners 27, 28 are formed by flexible contractible non-woven cloths formed of synthetic fibers, such as polypropylene, polyester, nylon or rayon, spun alone or as articles mixedly spun at a pre-set mixing ratio and thermally fused together or bonded together with a binder, such as a thermoplastic resin or rubber, so as not to cause entanglements, as in the conventional disc cartridge 100 described previously. The upper and lower liners 27, 28 are formed as rings having the outer diameter approximately equal to the inner diameter of the disc housing section 14 and are cut out in the mid areas thereof in register with the recording/reproducing apertures 27a, 28a. The upper and lower liners 27, 28 are formed with cut-outs 27b, 28b substantially coextensive as the recording/reproducing apertures 12b, 13b.

Although not shown in detail, the upper and lower liners 27, 28 are mounted to the cartridge halves 12, 13 by welding ribs formed on the inner surfaces of the cartridge halves 12, 13 making up the disc housing section 14. The welding ribs are formed as annular protrusions of minor height and thermally melted and secured to the inner sides of the cartridge halves 12, 13 by heat-welding. The upper and lower liners 27, 28 may also be secured to the inner sides of the cartridge halves 12, 13 using an adhesive.

The upper and lower liners 27, 28, thus mounted on the upper and lower cartridge halves 12, 13, are uplifted by the first to third lifter units 15 to 18 into pressure contact with the upper and lower sides of the disc 1 housed in the disc housing section 14. With the disc 1 run in rotation, the upper and lower liners 27, 28 are slid in contact with the upper and lower sides of the disc 1 to wipe off the affixed dust and dirt.

The first to third lifter units 15 to 17 are formed in the inner surfaces of the upper and lower cartridge halves 12, 13 by approximately 90° along the direction of disc rotation beginning from the recording/reproducing apertures 12b, 13b. The first to third lifter units 15 to 17 are constituted by first rib-like protrusions 18, 21 formed on the inner sides of the upper cartridge half 12 and by second rib-like protrusions 19, 22 and third rib-like protrusions 20, 23 formed on the inner sides of the lower cartridge half 13, with the first rib-like protrusions 18, 21 and the second and third rib-like protrusions 19, 22, 20, 23 being of sufficient height to press the upper and lower liners 27, 28 against the front and back sides of the disc 1.

The first rib-like protrusions 18, formed on the upper cartridge half 12 constituting the first lifter unit 15, are made up of a pair of parallel radial ribs 29a, 29b, extending substantially perpendicular to the direction of disc rotation, and a large number of parallel circumferential ribs 30 extending parallel to the direction of disc rotation. The first rib-like protrusions 18 in their entirety are substantially comb-shaped by the parallel circumferential ribs 30 being connected as-one to the lateral sides of the radial rib 29b disposed on the downstream side in the direction of disc rotation so that the parallel ribs extend at right angles to the radial rib 29b. The first rib-like protrusions 21 on the lower cartridge half 13, constituting the first lifter unit 15, is constituted by a trapezoidally-shaped protrusion extending in a direction substantially at right angles to the direction of disc rotation, as shown in FIG. 6.

Figure 7:
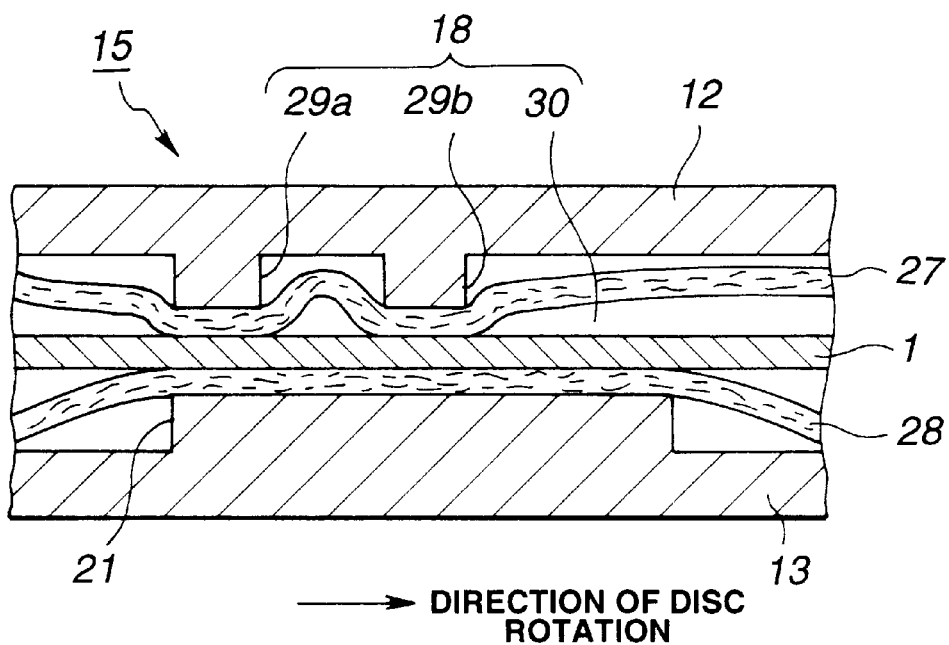
FIG. 7 is a schematic longitudinal cross-sectional view for illustrating the structure of a first lifter provided on the disc cartridge.

Thus, the first lifter unit 15 presses the upper liner 27 against the disc 1 by the radial ribs 29a, 29b in a direction at right angles to the direction of disc rotation, that is across the inner and outer rims of the disc 1. On the other hand, the first lifter unit 15 presses the upper liner 27 against the disc 1 by the circumferential ribs 30 circumferentially along the direction of disc rotation. Since the first lifter unit 15 flexes the upper liner 27 between the circumferential ribs 30, as shown in FIG. 7, the cleaning action for the disc 1 by the upper and lower liners 27, 28 can be reliably achieved even if the major surfaces of the upper and lower cartridge halves 12, 13 are distorted slightly.

The first rib-like protrusions 19, formed on the upper cartridge half 12 constituting the second lifter unit 16, are constituted by trapezoidally-shaped protrusions extending substantially at right angle to the direction of disc rotation. The second rib-like protrusions 22, formed on the lower cartridge half 13 of the second lifter unit 16, are made up of a pair of radial ribs 31a, 31b extending radially relative to the direction of disc rotation, and a large number of circumferential parallel ribs 32 extending parallel to the direction of disc rotation, as shown in FIG. 6. Stated differently, the second lifter unit 16 is configured so that the combination of the second rib-like protrusions 19, 22 is reversed in the up-and-down direction from the combination of the first rib-like protrusions 18 and 21 making up the first lifter unit 15, as shown in FIG. 8.

Figure 8:
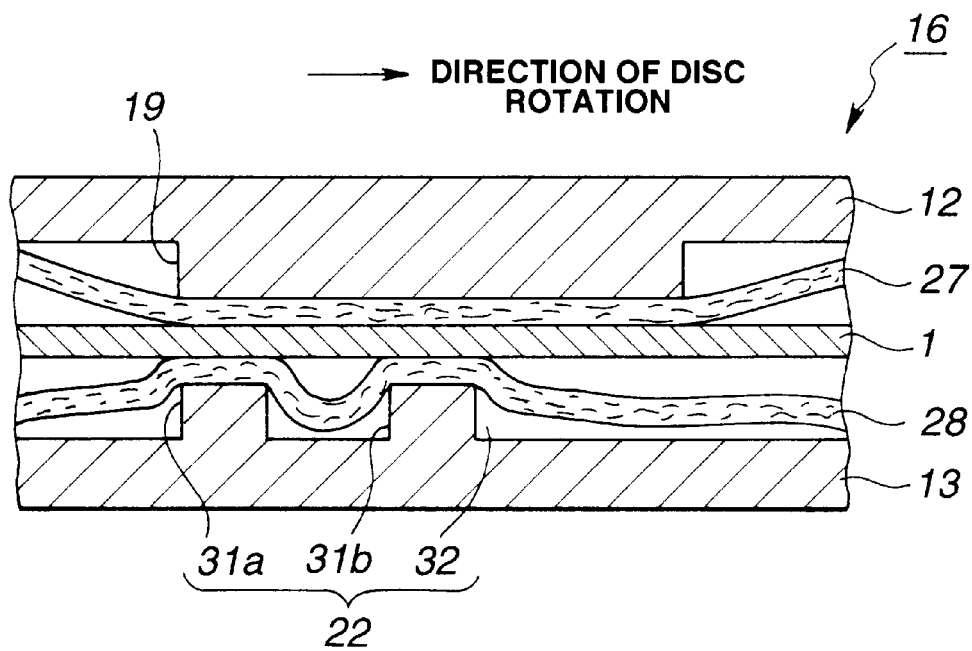
FIG. 8 is a schematic longitudinal cross-sectional view for illustrating the structure of a second lifter provided on the disc cartridge.
Figure 9:
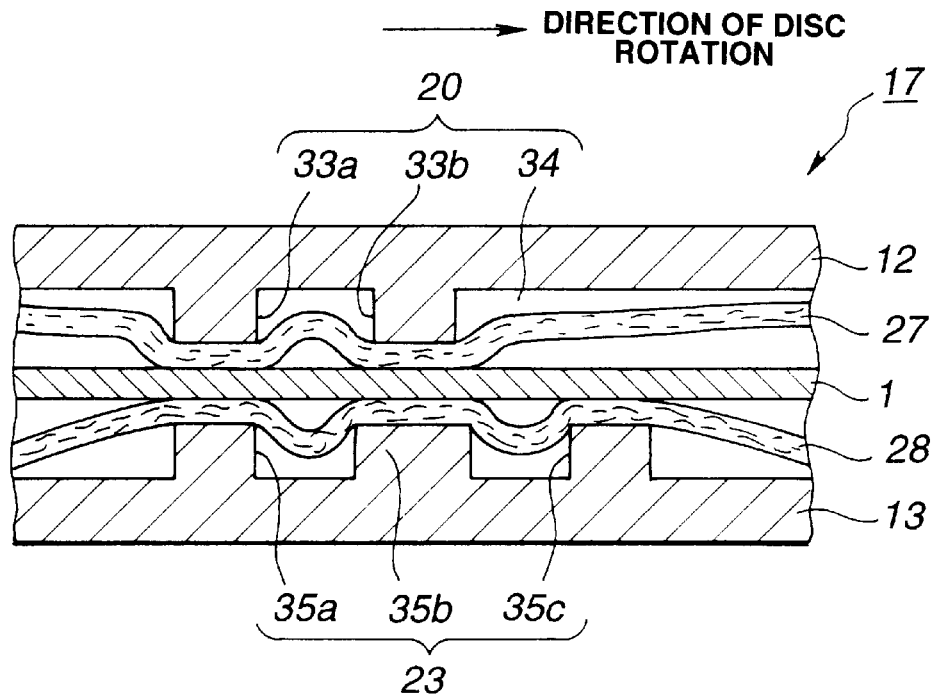
FIG. 9 is a schematic longitudinal cross-sectional view for illustrating the structure of a third lifter provided on the disc cartridge.

Thus, the first lifter unit 16 presses the lower liner 28 by the radial ribs 31a, 31b against the disc 1 in a direction perpendicular to the direction of disc rotation, in other words, across the inner and outer rims of the disc 1, as shown in FIG. 8. On the other hand, the second lifter unit 16 presses the lower liner 28 by the circumferential ribs 32 in a circumferential direction along the direction of disc rotation. Since the second lifter unit 16 flexes the lower liner 28 between the parallel ribs 32, as shown in FIG. 8, the cleaning action for the disc 1 by the upper and lower liners 27, 28 can be reliably achieved even if the major surfaces of the upper and lower cartridge halves 12, 13 are distorted slightly. Moreover, since the first lifter unit 15 and the second lifter unit 16 are reversed in structure in the up-and-down direction, the cleaning action and the torque braking action can be applied in stable state by the upper and lower liners 27, 28 to the disc 1.

The third rib-like protrusions 20, formed on the upper cartridge half 12 of the third lifter unit 17, are made up of paired radial ribs 33a, 33b, extending substantially at right angles to the direction of disc rotation, and a large number of circumferential ribs 34 extending parallel to the direction of disc rotation. The third rib-like protrusions 20 are substantially comb-shaped in their entirety by the circumferential ribs 34 being connected as-one to the lateral sides of the radial rib 33b, disposed on the downstream side in the direction of disc rotation, so that the circumferential ribs 34 are perpendicular to the radial ribs while being parallel to one another.

The third rib-like protrusions 23, formed on the lower cartridge half 13 constituting the third lifter unit 17, are constituted by a first rib-like protrusion 35a to a third rib-like protrusion 35c extending parallel to one another and substantially at right angles to the direction of disc rotation. The first rib-like protrusion 35a, formed on the upstream side in the direction of disc rotation, faces the radial rib 33a on the side of the upper cartridge half 12 across the inner and outer rims of the disc 1. The centrally disposed second rib-like protrusion 35b is slightly larger in circumferential width than the remaining rib-like protrusions 35a, 35c and faces the radial rib 33b provided on the upper cartridge half 12 across the inner and outer rims of the disc. Moreover, the third rib-like protrusion 35c is substantially of the same width as the first rib-like protrusion 35a, and faces the circumferential ribs 34 of the upper cartridge half 12 so as to be astride the ribs 34.

Figure 10:
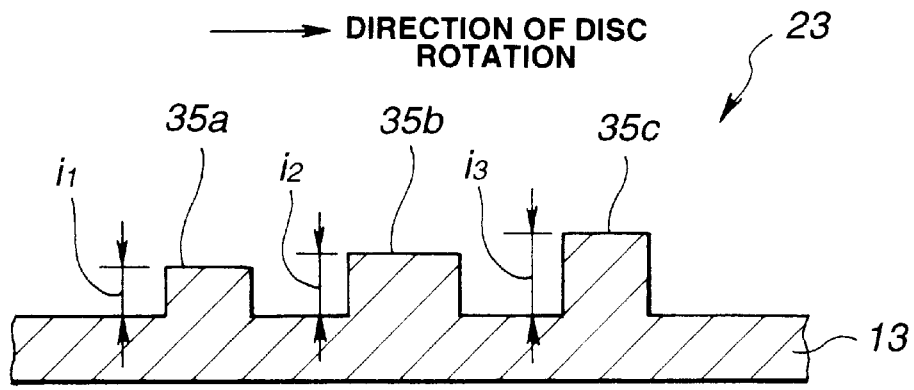
FIG. 10 is a schematic longitudinal cross-sectional view for illustrating the structure of a rib formed protrusions on the lower cartridge half constituting the third lifter.

The third rib-like protrusion 23 is set so that the first to third rib-like protrusions 35a to 35c are i1, i2 and i3 in height, respectively, as shown in FIG. 10. These first to third rib-like protrusions 35a to 35c are set so that the heights i1 to i3 thereof will be progressively increased along the direction of disc rotation, that is so that i1<i2<i3. Consequently, the disc cartridge 10 is designed so that the amount of uplifting of the lower liner 28 by these first to third rib-like protrusions 35a to 35c will be progressively larger along the direction of disc rotation. Thus, with the disc cartridge 10, the disc 1 faces the recording/reproducing apertures 12b, 12c in such a state in which the upper and lower surfaces of the disc cartridge are positively cleaned by the upper and lower liners 27, 28.

Figure 11:
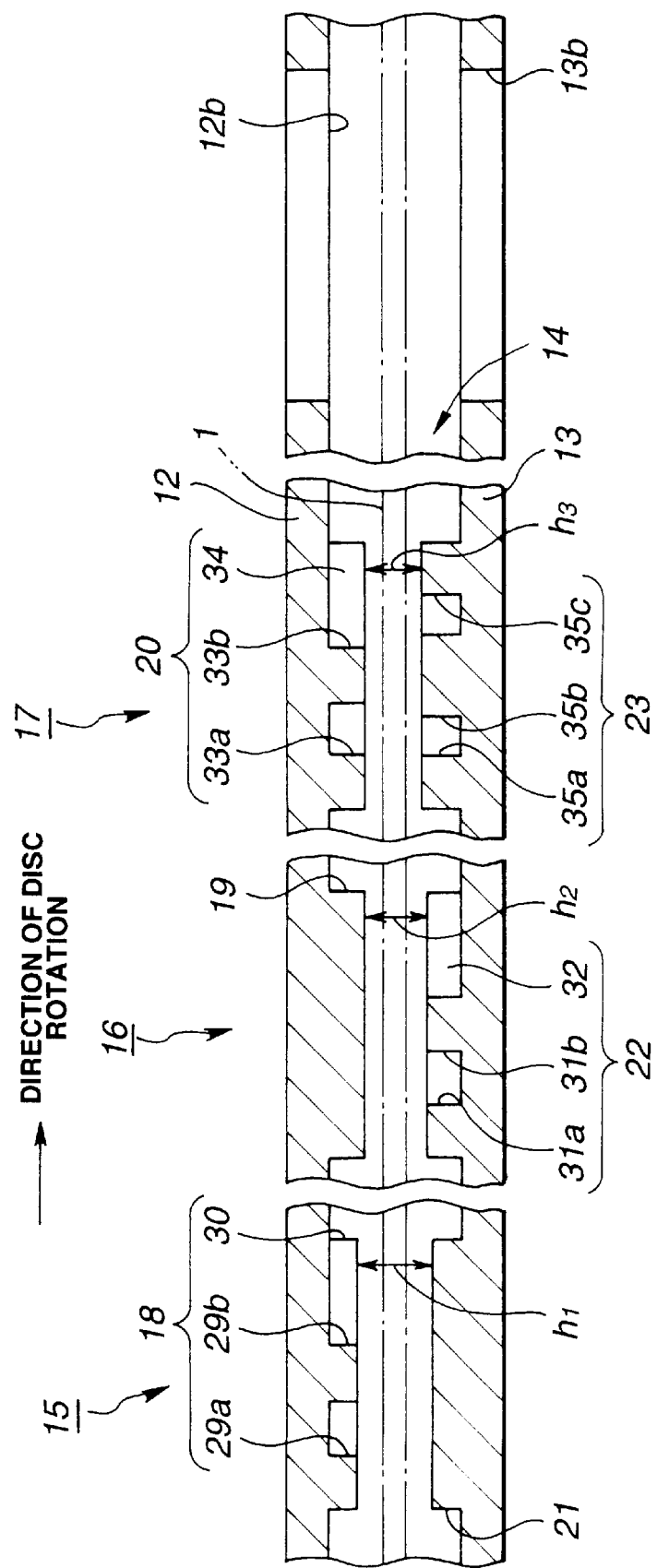
FIG. 11 is a schematic longitudinal cross-sectional view for illustrating the structure of first to third lifter units provided on the disc cartridge.

The first lifter unit 15 to the third lifter unit 17 are set to a facing interval sufficient to permit the upper and lower liners 27, 28 to compress against the upper and lower sides of the disc 1 with a pre-set contact pressure. Specifically, with the first lifter unit 15, the facing distance h1 between the first rib-like protrusion 18 of the upper cartridge half 12 and the first rib-like protrusion 21 of the lower cartridge half 13 is slightly larger that the sum of the thicknesses of the disc 1 and the thicknesses of the upper and lower liners 27, 28, as shown in FIG. 11. Similarly, with the second lifter unit 16, the facing distance h2 between the second rib-like protrusion 19 of the upper cartridge half 12 and the second rib-like protrusion 22 of the lower cartridge half 13 is slightly larger that the sum of the thicknesses of the disc 1 and the thicknesses of the upper and lower liners 27, 28. With the third lifter unit 18, the facing distance h3 between the third rib-like protrusion 20 of the upper cartridge half 12 and the third rib-like protrusion 23 of the lower cartridge half 13 is slightly larger that the sum of the thicknesses of the disc 1 and the thicknesses of the upper and lower liners 27, 28.

The first lifter unit 15 to the third lifter unit 17 are set so that the facing distances h1 to h3 will be progressively smaller in the direction of disc rotation, that is so that h1>h2>h3. That is, with the disc cartridge 10, the amount of uplifting by the first lifter unit 15 to the third lifter unit 18 will be progressively larger along the direction of disc rotation. Thus, with the disc cartridge 10, the disc 1 faces the recording/reproducing apertures 12b, 12c in such a state in which the upper and lower surfaces of the disc cartridge are positively cleaned by the upper and lower liners 27, 28.

With the disc cartridge 10, the magnetic head unit is intruded via the opened recording/reproducing apertures 12b, 13b into the inside of the main cartridge body unit 11 so that the loaded magnetic heads will be contacted with the upper and lower surfaces of the disc 1. With the disc cartridge 10, since the disc 1 faces the recording/reproducing apertures 12b, 12c in such a state in which the upper and lower surfaces of the disc cartridge are cleaned positively, the information signals can be recorded/reproduced positively, while the magnetic head or the disc can be positively prevented from being destroyed.

Moreover, with the disc cartridge 10, the first lifter unit 15 to the third lifter unit 17, doing the cleaning and torque braking operations in cooperation with the upper and lower liners 27, 28, are formed as-one with the upper and lower halves 12, 13. Thus, with the disc cartridge 10, the laborious lifter assembling operation may be eliminated, in contradistinction from the conventional disc cartridge 100, thus assuring more reasonable assembling operation. Also, the risk of creeping on prolonged use, leading to the deteriorated function, may be eliminated to improve reliability.

In the above-described disc cartridge 10, the first lifter unit 15 to the third lifter unit 17 are provided on the upper and lower halves 12, 13 at a separation of 90° relative to one another along the direction of disc rotation, beginning from the recording/reproducing apertures 12b, 12c. Alternatively, two or four or more lifter units may also be used. Moreover, the rib-like protrusions of the first and second lifter units 15 and 16 may be reversed in structure or configured similarly to the rib-like protrusions of the third lifter unit 18.

In the above-described embodiments, the first lifter unit 15 to the third lifter unit 17 are formed as-one with the rib-like protrusions on the inner surfaces of the upper and lower cartridge halves. Alternatively, these rib-like protrusions may be formed with a relative offset along the direction of disc rotation.

The disc cartridge 10 is not limited to the floppy disc cartridge holding the floppy disc and may also be a magnetic disc cartridge holding a so-called magneto-optical disc. The present invention may also be applied to other disc cartridges in need of disc cleaning or torque braking.

What is claimed is:

1. A disc cartridge comprising:
   a disc-shaped recording medium;
   a main cartridge body unit made up of a pair of cartridge halves abutted and connected to each other for defining therein a disc housing section in which to hold rotatably said disc-shaped recording medium;
   a pair of liners arranged in the inside of the disc housing section of said paired cartridge halves, said liners being arranged for having a sliding contact with the upper and lower surfaces of the rotating disc-shaped recording medium for wiping off the affixed dust and dirt; and
   lifter means comprised of paired rib-like protrusions formed on the inner surfaces of said pair of cartridge halves delimiting said disc housing section in a facing relation to each other, said rib-like protrusions pressing the liners against the front and back surfaces of the disc-shaped recording medium;
   plural sets of said lifter means being provided in the disc housing section of said cartridge halves along the direction of rotation of the disc-shaped recording medium, at least one rib-like protrusion of said paired rib-like protrusions being substantially comb-shaped and being made up of radial ribs extending at right angles to the direction of rotation of the disc-shaped recording medium and a number of parallel circumferential ribs connected as-one to said radial ribs on the downstream side thereof in the direction of rotation of the disc-shaped recording medium so that said parallel circumferential ribs run at right angles to said radial ribs.

2. The disc cartridge as claimed in claim 1 wherein said rib-like protrusions of the plural sets of the lifter means are set so that the facing distances thereof with respect to the recording/reproducing apertures formed in the main cartridge body unit are progressively decreased along the direction of rotation of said disc-shaped recording medium.

3. The disc cartridge as claimed in claim 1 wherein, of said plural sets of lifter means, the set of lifter means arranged directly upstream of the recording/reproducing aperture formed in said main cartridge body unit along the direction of rotation of said disc-shaped recording medium has its one rib-like protrusions designed as substantially comb-shaped rib-like protrusions, with the other rib-like protrusions being made up of plural ribs extending in a direction at right angles to the direction of disc rotation.

4. The disc cartridge as claimed in claim 3 wherein, in the lifter means arranged directly upstream of the recording/reproducing aperture along the direction of disc rotation, said plural ribs are set in height so that the facing distances thereof are decreased progressively along the direction of rotation of the disc-shaped recording medium.

* * * * *